United States Patent Office 3,222,961
Patented Dec. 14, 1965

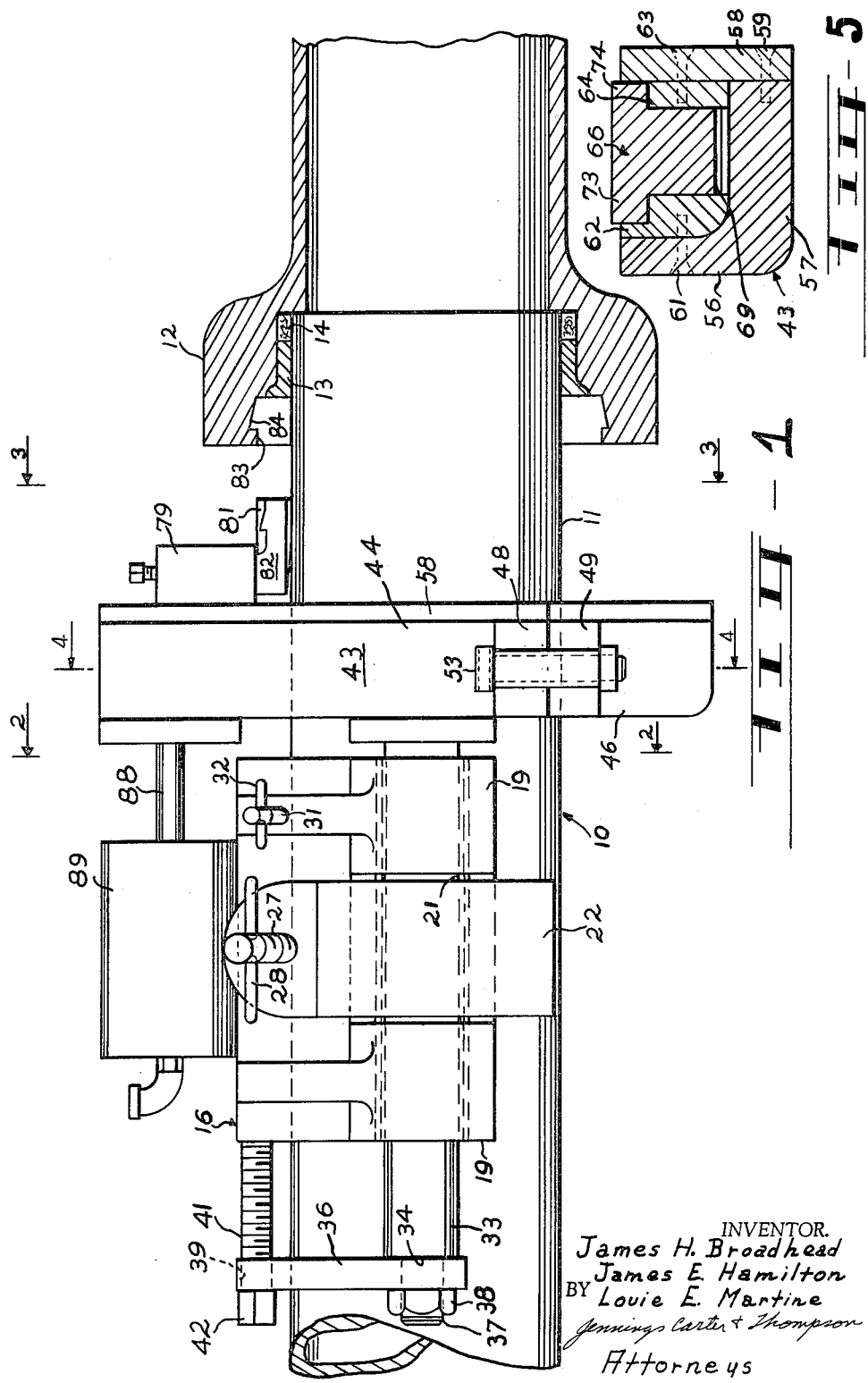

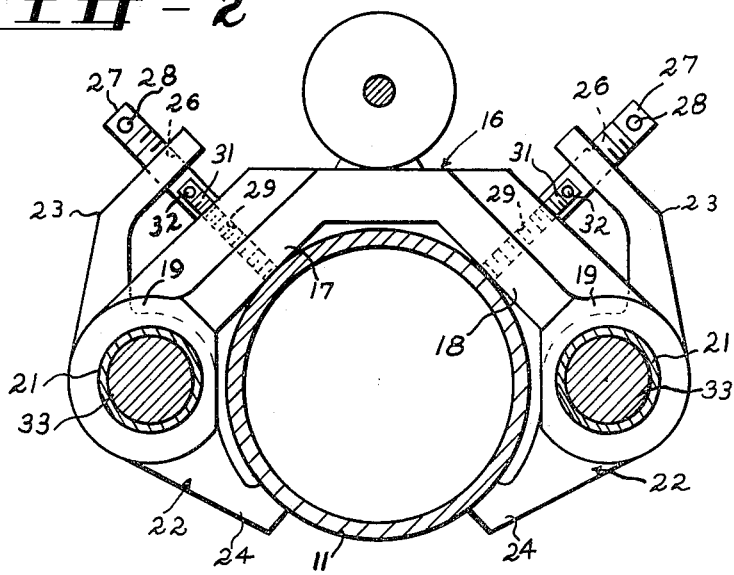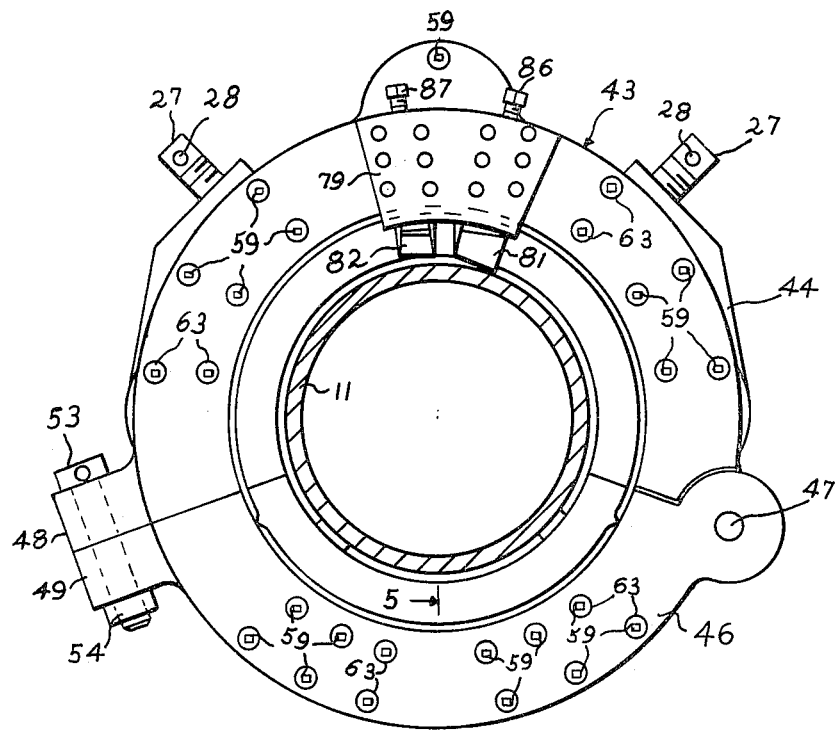

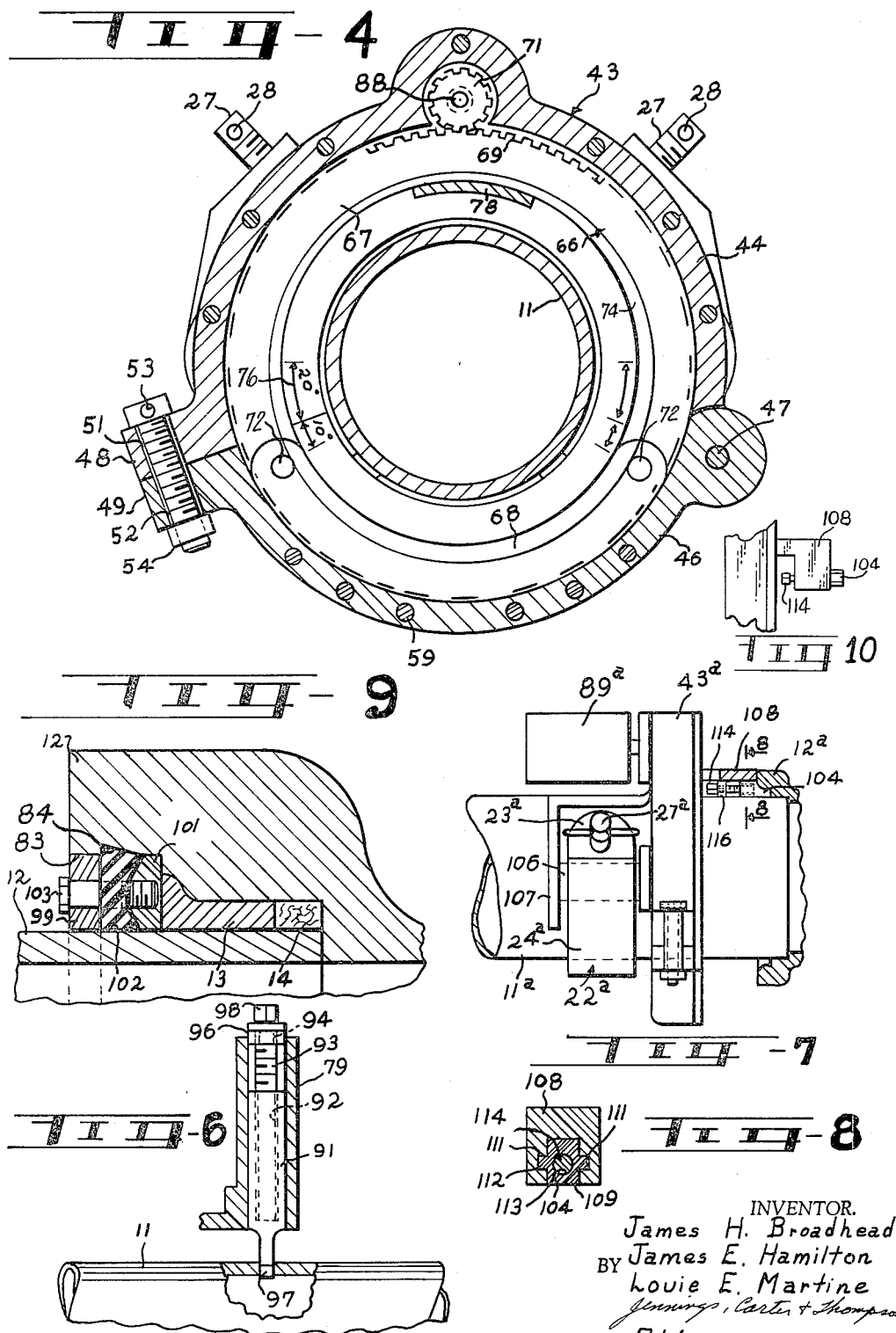

3,222,961
APPARATUS FOR MAKING AN ANNULAR CUT IN A CYLINDRICAL-LIKE ARTICLE
James H. Broadhead, James E. Hamilton, and Louie E. Martine, Birmingham, Ala., assignors, by direct and mesne assignments, to Utility Tool Company, a corporation of Delaware
Filed Oct. 15, 1962, Ser. No. 230,360
7 Claims. (Cl. 82—70.2)

This invention relates to apparatus for making an annular cut in a generally cylindrical article and more particularly to such apparatus which is adapted to be clamped about a generally cylindrical article without having to pass the end of the cylindrical article through the apparatus, thereby particularly adapting the apparatus for use in the repair of pipe lines without having to disconnect or cut the pipe line for receiving the apparatus.

An object of our invention is to provide apparatus for making an annular cut in a cylindrical-like article which shall include an annular split housing, a ring gear mounted for rotation within the housing and a cutting tool carried by the ring gear whereby upon rotation of the ring gear, an annular cut is made in the article.

Another object of our invention is to provide apparatus of the character designated which shall include improved means for mounting the apparatus on a cylindrical article whereby the cutting tool moves in a path which is concentric with the cylindrical article.

Another object of our invention is to provide apparatus of the character designated which shall include improved means for retaining the ring gear within the split housing upon removal of a section of the housing, thereby greatly facilitating the operation of the apparatus.

Another object of our invention is to provide apparatus of the character designated in which the ring gear that carries the cutting tool is provided with a removable section whereby the cylindrical article to be cut may be inserted within the ring gear.

Another object of our invention is to provide apparatus of the character designated in which the ring gear and the means for driving the same are mounted wholly within the confines of a split housing, whereby the ring gear and the driving mechanism therefor are maintained in a clean condition at all times, thereby assuring trouble free operation of our improved apparatus.

A still further object of our invention is to provide apparatus of the character designated which shall be simple of construction, economical of manufacture and one which is particularly adapted for making an annular cut in the bell end of a pipe unit comprising a spigot and bell portion joined to each other.

As is well known in the art to which our invention relates, various types of cutting apparatus have been proposed for making annular cuts in cylindrical-like articles. However, so far as we are aware, such apparatus has been unsatisfactory due to the fact that no effective means has been provided for centering the cutting tool relative to the article to be cut and the driving mechanism for the cutting tool has been exposed whereby it is in constant contact with grit, dirt and other foreign materials.

Briefly, our improved apparatus for making an annulai cut in a cylindrical-like article comprises a split ring gear mounted for rotation within a split housing which is carried by a support bracket. Means is provided for detachably connecting the support bracket to the cylindrical-like article whereby the ring gear is positioned concentric wtih the cylindrical article. A cutting tool is carried by the ring gear whereby upon rotation of the ring gear, the cutting tool moves in a path which is concentric with the cylindrical article.

Apparatus embodying features of our invention is illustrated in the accompanying drawings, forming a part of this application, in which:

FIG. 1 is a side elevational view, partly broken away and in section, showing our improved apparatus mounted on a pipe unit;

FIG. 2 is a vertical sectional view taken generally along the line 2—2 of FIG. 1;

FIG. 3 is a sectional view taken generally along the line 3—3 of FIG. 1;

FIG. 4 is a sectional view taken generally along the line 4—4 of FIG. 1;

FIG. 5 is a fragmental, sectional view taken generally along the line 5—5 of FIG. 3;

FIG. 6 is a fragmental view, partly broken away and in section, showing a modified form of cutting tool which is adapted to make a radial cut into the cylindrical article;

FIG. 7 is a side elevational view, partly broken away and in section, showing a modified form of our apparatus wherein the split housing remains stationary after being mounted on the article to be cut;

FIG. 8 is a sectional view taken along the line 8—8 of FIG. 7;

FIG. 9 is an enlarged fragmental view showing a pipe line repair joint which may be formed by employing our improved apparatus; and, FIG. 10 is a fragmental, top plan view of the apparatus shown in FIGS. 7 and 8.

Referring now to the drawings for a better understanding of our invention, we show a cylindrical-like article 10 which may be in the form of a pipe line unit comprising a spigot section 11 and a bell section 12. Positioned between the spigot end 11 and the bell end 12 is a suitable annular packing, such as lead 13 and other packing materials indicated generally at 14.

While we show the cylindrical article as being in the form of a pipe line, it will be apparent that the cylindrical-like article may be in the form of a shaft or the like. Accordingly, throughout the specification and claims the term cylindrical-like article is intended to include any article having a generally cylindrical exterior surface.

The apparatus comprises a generally inverted V-shaped support bracket 16 having downwardly and outwardly extending side members 17 and 18 which are adapted to engage a cylindrical article, such as the spigot end 11, as shown in FIG. 2. The size and shape of the inverted V-shaped member 16 is such that upon inserting the device over the cylindrical spigot end 11, the spigot end is centered relative to the cutting assembly, to be described hereinafter.

The V-shaped member 16 is provided with a pair of bearing brackets 19 at opposite sides thereof in position to receive elongated sleeves 21. Mounted for pivotal movement about each of the sleeves 21, intermediate the bearing brackets 19, is a lock member 22 having an upwardly and inwardly extending portion 23 and a downwardly and inwardly extending portion 24. As shown in FIGS. 1 and 2, the downwardly and inwardly extending portions 24 engage the spigot 11 at points diametrically opposite the downwardly and outwardly extending side portions 17 and 18 of the V-shaped member 16. That is, the force exerted by the downwardly and inwardly extending portion 24 at the left side of FIG. 2 exerts a force along a line substantially perpendicular to the side member 18 while the downwardly and inwardly extending portion 24 at the right side of FIG. 2 exerts a force in a direction substantially perpendicular to the side member 17. Threaded openings 26 are provided in each of the upwardly and inwardly extending portions 23 in position to receive threaded members 27 which are adapted to engage the V-shaped member 16 whereby the lower end portions 24 of the lock members 22 are forced into engagement with the spigot end 11. The threaded members 27 are rotated by suitable handle-like members 28 which project through transverse openings provided in the members 27.

As shown in FIG. 2, threaded openings 29 are provided in the downwardly and outwardly extending side members 17 and 18 for receiving threaded members 31 having operating handles 32. The inner ends of the threaded members 31 are adapted to engage the exterior surface of the cylindrical spigot 11 whereby final adjustments may be made to firmly secure the support bracket 16 to the spigot 11. That is, should the cylindrical member be out of round or out of contact with the side members 17 or 18, the threaded member 31 is moved to a position whereby it engages the exterior surface of the cylindrical member to thereby align the support bracket 16 relative to the cylindrical member. Accordingly, the threaded members 31 are employed only where final adjustments are necessary, such as would be the case where a true cylindrical surface is not provided for engagement with the side members 17 and 18.

Mounted for sliding movement within the elongated sleeve members 21 are elongated guide bars 33. The rear end portions of the guide bars 33 are reduced in diameter to provide shoulders 34 which engage an arcuate bracket 36 which passes over the reduced diameter portions and connects the guide bars 33 to each other. The reduced diameter ends are threaded as at 37 for receiving nuts 38 whereby the arcuate bracket 36 is secured to the guide bars 33. A suitable opening 39 is provided in the central portion of the arcuate bracket 36 for receiving an externally threaded actuating member 41. A square end portion 42 is provided on the member 41 for receiving a suitable tool for rotating the actuating member 41. As shown in FIG. 1, the threaded actuating member 41 engages a threaded opening in the V-shaped bracket 16 whereby upon rotating the actuating member 41, the guide bars 33 are moved axially relative to the sleeve members 21.

Rigidly secured to opposite ends of the guide bars 33 from the ends thereof connected to the arcuate bracket 36 is a split housing indicated generally at 43. The split housing comprises an upper section 44 and a lower section 46 which are pivotally connected to each other adjacent a side thereof as at 47. The other sides of the sections 44 and 46 are provided with outwardly projecting lugs 48 and 49, respectively. Suitable openings 51 and 52 are provided in the lugs 48 and 49, respectively, for receiving a bolt 53 which is secured in place by a nut 54. Accordingly, the lugs 48 and 49 are detachably connected to each other whereby the lower section 46 of the split housing 43 may be pivoted downwardly about the pivot pin 47 for receiving the spigot 11.

As shown in FIG. 5, the split housing 43 is provided with a vertically extending annular wall 56 which is formed integrally with a horizontally extending annular wall 57. The forward side of the split housing 43 is provided with a vertically extending annular plate 58 which is secured to the annular wall 57 by suitable screws 59. Secured to the annular wall 56 by suitable screws 61 is an annular bearing member 62. In like manner, secured to the inner surface of the annular plate 58 by suitable screws 63 is an annular bearing member 64.

Mounted for rotation within the split housing 43 in position to engage the annular bearing members 62 and 64 is a split ring gear 66 having a major section 67 and a minor section 68. The ring gear 66 is provided with suitable teeth 69 which mesh with a pinion 71 which is also mounted for rotation within the housing 43, as shown in FIG. 4. The sections 67 and 68 of the ring gear 66 are detachably connected to each other by suitable pins 72 whereby the minor section 68 may be removed or swung out of position for receiving the spigot 11, as shown in FIG. 4.

As shown in FIG. 5, the ring gear is provided with laterally projecting annular members 73 and 74 which are adapted to engage the annular bearing members 62 and 64, respectively, as shown. The outside diameters of the annular members 73 and 74 of the ring gear 66 which engage the bearing members 62 and 64 are greater than the lengths of the chords between the inner bearing surfaces of the annular bearing members 62 and 64 at the points of connection of the housing section 44 to the housing section 46, whereby the split ring 66 is retained within the housing section 44 upon pivotal movement of the lower section 46 about the pivot pin 47. Preferably, the upper section of the split housing 44 extends substantially 20° below the horizontal center line of the housing 43, as indicated by the arrow 76 in FIG. 4. Also, the minor section 68 of the ring gear 66 is of a size for both pins 72 to be beneath the upper housing section 44 when the ring gear is in the position shown in FIG. 4.

Preferably, the major portion 67 of the ring gear 66 is of a size to extend approximately 10° beneath the lower edges of the uper split housing 44 when the ring gear 66 is in the position shown in FIG. 4. Accordingly, with the ring gear in the position shown in FIG. 4, the pins 72 may be readily removed since they are beneath the lower edges of the split housing section 44.

Secured to the ring gear 66 and projecting forwardly thereof is a tool holder bracket 78 which supports a suitable tool holder indicated generally at 79. Mounted within the tool holder 79 is a pair of cutting tools 81 and 82. The cutting tool 81 is adapted to make an annular cut 83 in the bell end 12 of a pipe line while the tool 82 is adapted to make a radially extending cut 84 in the bell end 12 after the cut 83 is made. Vertical adjustment of the tools 81 and 82 is made by suitable adjusting screws 86 and 87, respectively. The tools 81 and 82 are moved longitudinally of the pipe line by movement of the actuating member 41 which moves the entire housing unit 43 relative to the support member 16.

The pinion 71 is mounted on a shaft 88 of a suitable power unit 89, which may be in the form of a fluid pressure operated motor.

Where it is desired to have the cutting tool make an annular cut radially and inwardly of the cylindrical member 11, a cutting tool 91 is mounted within the tool holder 79, as shown in FIG. 6. A threaded opening 92 is provided in the cutting tool 91 for receiving a threaded actuating member 93. The upper end of the actuating member 93 is reduced in diameter as at 94 and is mounted for rotation in a suitable bearing block 96 whereby upon rotation of the actuating member 93, the tool 91 moves vertically relative to the tool holder 79 to thereby move its cutting edge 97 toward and away from the spigot 11. The upper end of the actuating member 93 is provided with a square head 98 for receiving a suitable tool for turning the actuating member.

From the foregoing description, the operation of our improved apparatus shown in FIGS. 1–6 will be readily understood. In order for the support member 16 to be positioned on the spigot 11, the threaded actuating members 27 are rotated in a direction to move outwardly of the side members 17 and 18. Accordingly, the lock members 22 are adapted to pivot whereby the lower portions 24 thereof move outwardly to permit insertion of the spigot 11 therebetween. Also, to permit insertion of the spigot inwardly of the split housing 43, the lower section 46 of the housing is pivoted downwardly about the pivot pin 47 and the minor section 68 of the ring gear 66 is removed. That is, the securing bolt 53 is removed from the lugs 48 and 49 and the pins 72 are removed from the sections 67 and 68 of the split ring gear.

After insertion of the spigot 11 inwardly of the housing 43 and the lock members 22, the actuating members 27 are rotated in a direction to move inwardly toward the side members 17 and 18. As the lower portions 24 of the lock members 22 engage the exterior surface of the cylindrical member, the housing 43 is positioned concentric with the spigot 11. Should there be any deformities in the spigot 11 or should the spigot be out of round, such deformities are corrected by means of the adjusting screws 31 which move into direct contact with the exterior surface of the spigot 11.

With the V-shaped support member 16 thus secured to the spigot 11, the minor section 68 of the ring gear 66 is attached to the section 67 thereof by inserting the pins 72. The lower section 46 of the split housing 43 is then swung upwardly into position whereby the lugs 48 and 49 are secured to each other by the securing bolt 53. The cutting tools are moved toward the article to be cut, such as a radially extending flange of a bell section 12, by rotating the actuating member 41 in the desired direction. With the cutting tool in the cutting position, the power unit 89 is energized whereby the pinion 71 drives the ring gear 66 to rotate the cutting tool about the spigot 11. As the cutting tool cuts the annular groove in the face of the bell section 12, the actuating member 41 is rotated to continuously position the cutting tool in contact with the surface to be cut. After the annular cut has been made by the cutting tool 81, the annular recess 84 may be formed in the recess 83 originally cut in the face of the bell by moving the cutting tool 82 outwardly in a radial direction whereby it engages the outer surface of the groove 83 to thus make the cut 84.

Where it is desired to cut a groove in a cylindrical article or cut the cylindrical article, the tool 91 is employed. In this case, the cutting edge 97 would move radially inwardly into engagement with the cylindrical member to be cut.

After the desired cut has been made in the cylindrical member, the cutting tool is removed by rotating the actuating member 41 in the desired direction. The apparatus is then removed from the spigot 11 by releasing the lower section 46 of the split housing, removing the minor section 68 of the ring gear and releasing the lock members 22. It will be noted that by providing annular bearing surfaces on the ring gear which are of a larger diameter than the lengths of the chords between the annular bearing areas of the split housing at the point of separation of the lower section thereof from the upper section thereof, the ring gear remains in the upper section 44 and is supported thereby after the lower section 46 has been lowered, thus facilitating removal of the minor section 68 of the ring gear.

After the annular grooves 83 and 84 are cut in the face of the bell 12 of the pipe line, a suitable repair joint may be provided by inserting a sealing unit comprising spaced apart metal rings 99 and 101 having a resilient annular gasket 102 therebetween. The metal rings 99 and 101 are urged toward each other by a suitable retaining member 103 to thus form a repair joint. In view of the fact that the repair joint forms no part of the present invention, no further description thereof is deemed necessary.

In FIGS. 7, 8 and 10 of the drawings, we show a modified form of our apparatus in which a split housing unit 43$^a$ is mounted on a cylindrical unit comprising a spigot 11$^a$ connected to a bell 12$^a$. Instead of providing means for moving the split housing 43$^a$ relative to the bell 12$^a$, we provide means for moving the cutting tool indicated at 104 relative to the housing 43$^a$. That is, in some instances, there is not sufficient room on the cylindrical member to provide for longitudinal movement of the entire housing relative to the cylindrical member. To reduce the overall length of the apparatus, we mount the split housing 43$^a$ directly on the cylindrical member by suitable lock members 22$^a$ having an upper section 23$^a$ which extends upwardly and inwardly and a lower section 24$^a$ which extends downwardly and inwardly. The lock members 22$^a$ are held in selected positions by an actuating member 27$^a$. The lock member 22$^a$ is mounted for rotation on a suitable shaft 106 which is supported between the housing 43$^a$ and a depending bracket 107 carried by the housing 43$^a$. In view of the fact that the operation of the lock members 22$^a$ is identical to the operation of the lock members 22, no further description thereof is deemed necessary. Also, the construction and operation of the split housing 43$^a$ is substantially identical to the construction and operation of the split housing 43. That is, the split housing 43$^a$ encases a split ring gear which is driven by a suitable power unit indicated at 89$^a$.

The tool 104 is carried by a tool holder 108 which is carried by the ring gear in the same manner as the tool holder 79 is carried by the ring gear 66. To permit longitudinal adjustment of the tool 104 relative to the bell end 12$^a$, we mount the tool 104 for longitudinal movement relative to a downwardly opening, elongated guideway 109. Longitudinally extending recesses 111 are provided in the tool holder 108 for receiving outwardly projecting flanges 112 carried by the tool 104, as shown in FIG. 8. By providing the longitudinally extending recesses and the outwardly projecting flanges 112, the tool 104 is held within the tool holder 108 and is adapted for longitudinal movement relative thereto.

To move the tool 104 longitudinally of the tool holder 108, we provide a threaded opening 113 in the tool 104 for receiving a threaded member 114. A square head, or the like is provided on the end of the threaded member 114 for receiving a suitable tool whereby the threaded member may be rotated. A suitable clearance is provided between the end of the threaded member 114 and the tool holder 108 for receiving a tool for turning the threaded member. The end of the threaded member 114 adjacent the head thereof is reduced in diameter and is mounted for free rotation relative to a suitable collar or the like indicated generally at 116. That is, upon rotation of the threaded member 114, the tool 104 moves axially of the threaded member 114 to thereby move longitudinally of the guideway 109.

From the foregoing, it will be seen that we have devised an improved apparatus for making an annular cut in a cylindrical-like article. By providing a generally V-shaped bracket together with means for securing the bracket firmly to the cylindrical article, the support bracket and the split housing are aligned relative to the cylindrical article to thus position the ring gear concentric to the cylindrical article. Also, by providing a split housing having an upper section which extends below the horizontal, the ring gear is maintained within the upper section of the housing after the lower section thereof has been separated from the upper section. Also, by providing a ring gear having a minor section which is adapted to be positioned wholly below the upper section of the split housing, the minor section of the ring gear may be readily removed with a minimum of effort. Furthermore, by providing a ring gear and drive mechanism therefor which is positioned wholly within the confines of the split housing, the driving mechanism is maintained in a clean condition at all times, thereby providing for trouble free operation of the apparatus and at the same time prolonging the life of the apparatus.

While we have shown our invention in several forms, it will be obvious to those skilled in the art that it is not so limited but is susceptible of various other changes and modifications without departing from the spirit thereof, and we desire, therefore, that only such limitations shall be placed thereupon as are specifically set forth in the appended claims.

What we claim is:

1. Apparatus for making an annular cut in a cylindrical-like article comprising:
   (a) a support bracket,
   (b) means to mount said support bracket on the article to be cut,
   (c) an annular split housing carried by said support bracket disposed to surround said cylindrical-like article and having a first section detachably connected to a second section, with said first section extending an angular distance greater than said second section,
(d) a split ring gear mounted for rotation within said housing and disposed to surround said cylindrical-like article,
(e) there being an annular guideway within said split housing for receiving said split ring gear,
(f) an annular bearing member carried by said split ring gear and having a diameter greater than the length of the chord extending between the points of connection of said first and second sections of said annular housing whereby said split ring gear is retained within said first section upon separation of said second section from said first section,
(g) a cutting tool carried by said split ring gear in position to engage the article to be cut, and
(h) means to rotate said split ring gear whereby said cutting tool moves around said article to make an annular cut therein.

2. Apparatus for making an annular cut in a cylindrical-like article as defined in claim 1 in which said support bracket comprises:
(a) a generally inverted V-shaped member having downwardly extending side members adapted to engage said cylindrical-like article,
(b) at least one pair of lock members mounted for pivotal movement adjacent the lower ends of said side members,
(c) each of said lock members having a depending portion disposed to engage said cylindrical-like article at a point diametrically opposite a side thereof engaged by one of said side members, and
(d) means to move said lock members into engagement with said cylindrical-like article whereby the support bracket is secured to the cylindrical-like article.

3. Apparatus for making an annular cut in a cylindrical-like article as defined in claim 2 in which the annular split housing is mounted on said support bracket in position to surround said cylindrical-like article and be concentric therewith upon engagement of said lock members with said cylindrical-like article.

4. Apparatus for making an annular cut in a cylindrical-like article as defined in claim 1 in which a cutting tool is mounted on said ring gear for radial adjustment relative to said ring gear.

5. Apparatus for making an annular cut in a cylindrical-like article as defined in claim 1 in which a tool is mounted on said split ring gear for transverse adjustment relative to said ring gear whereby said tool is movable longitudinally of the article to be cut.

6. Apparatus for making an annular cut in a cylindrical-like article as defined in claim 1 in which said second section of the split housing is connected to the first section thereof at points approximately 20° below the horizontal center line of said housing.

7. Apparatus for making an annular cut in a cylindrical-like article as defined in claim 6 in which the split ring gear is provided with a major section and a minor section connected to each other, said minor section being of a size to be positioned below said first section of the split housing upon separation of said second section of said split housing from the first section thereof, whereby said minor section may be removed for insertion of the cylindrical-like article to be cut.

References Cited by the Examiner
UNITED STATES PATENTS

| | | |
|---|---|---|
| 596,295 | 12/1897 | French. |
| 770,381 | 9/1904 | McMillen. |
| 1,417,621 | 5/1922 | Marsh _____ 82—4 |
| 1,923,967 | 8/1933 | Brown. |
| 2,129,253 | 9/1938 | Willis _____ 82—4 |
| 2,280,646 | 4/1942 | Gosstrom. |
| 2,796,792 | 6/1957 | Dias _____ 82—4 |

WILLIAM W. DYER, JR., *Primary Examiner.*